Nov. 27, 1951   G. P. BRUBAKER   2,576,250
SOUND RECORDER

Filed Aug. 26, 1944   2 SHEETS—SHEET 1

INVENTOR
George P. Brubaker
BY John Flam
ATTORNEY

Patented Nov. 27, 1951

2,576,250

UNITED STATES PATENT OFFICE 2,576,250

SOUND RECORDER

George P. Brubaker, Los Angeles, Calif., assignor, by mesne assignments, to Dictaphone Corporation, New York, N. Y., a corporation of New York Application August 26, 1944, Serial No. 551,304

2 Claims. (Cl. 274—9)

This invention relates to sound recorders, and particularly to recorders that utilize a stylus for marking a moving record blank.

Such recorders usually include a rotating turntable, or other moving support, upon which the record blank is supported. Under ordinary conditions of operation, recorders of this character are readily constructed to operate in a highly satisfactory manner. However, when subjected to mechanical disturbances, such as in a vehicle, a recorder of this character is virtually inoperative. This is due to vibrations and irregular motions to which the rotating table is subjected, and which produce extraneous and disturbing angular motion of the turntable. Such disturbances are especially pronounced when recording is attempted in an airplane in flight; and, although it is especially important to obtain a record of occurrences in airplanes that are employed in combat duty, the conditions of flight of such planes render it even less possible to obtain a record capable of intelligent interpretation.

This is caused by the fact that the turntable has some weight or inertia. When the entire apparatus is subjected to erratic and abrupt movement, the inertia of such tables inevitably causes undesired relative angular movement between the table and the recording stylus.

It is one of the objects of this invention to obviate such undesired relative movement even when extremely rapid or abrupt movement takes place, as may be the case in airplanes or the like.

It is another object of this invention to provide a simple and effective stabilizer for apparatus subjected to sudden changes in direction and speed of movement.

This invention possesses many other advantages, and has other objects which may be made more clearly apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 2:
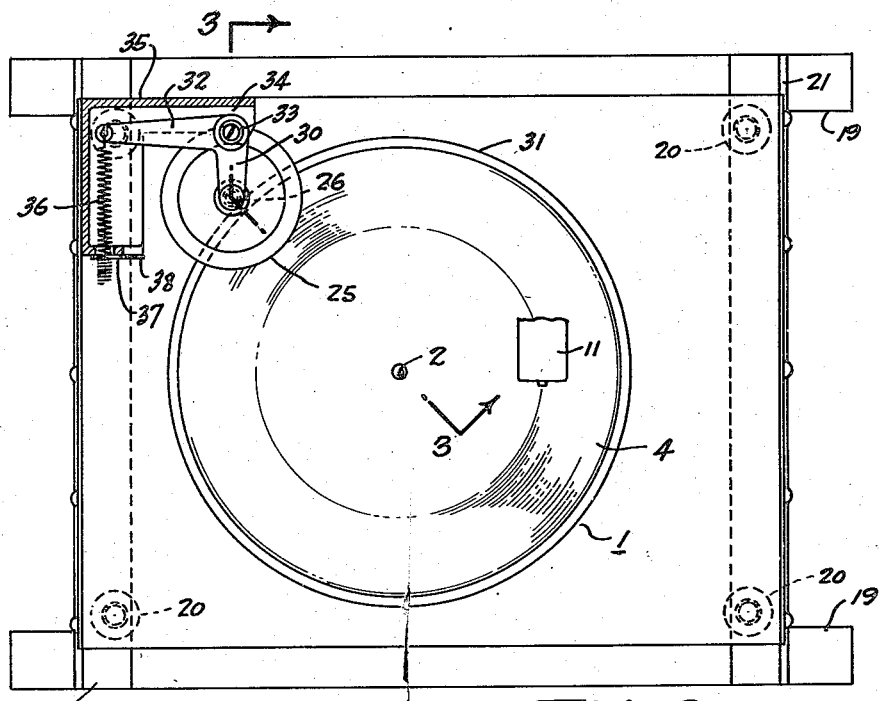
Fig. 2 is a top plan view thereof.

The phonograph in this instance is shown as having a turntable structure 1 that is rotatable about a vertical axis 2. This structure 1 includes an upper record supporting member 3 upon which a record 4 is disposed. This supporting member 3 is driven by an axially displaced disclike member 5. The transmission of torque between these two members is effected by an interposed sponge-rubber ring 6, between the members 3 and 5, and attached by an appropriate adhesive to these members.

The upper supporting member 3 is attached to a spindle 7, by the aid of which the turntable structure may be appropriately guided for angular movement.

The manner of supporting and driving the turntable structure is quite similar to that described in an application filed in the name of George P. Brubaker under Serial Number 492,538 on June 28, 1943, now Patent No. 2,463,513, issued March 8, 1949, and entitled "Sound Recorder."

Thus spindle 7 is shown in this instance as supported in a bearing structure 8 attached to the upper frame 9, attached to the casing 10. A stylus recording head 11 is shown as cooperating with the record disc 4 and may be appropriately supported and moved as, for example, in the prior filed application hereinabove referred to.

The turntable structure 1 is adapted to be driven at a substantially uniform angular rate by the aid of a friction roller 12. This roller may have a rim of material, such as rubber, which can drive the member 5 by contact with the lower surface of the member 5. The roller 12 is shown as mounted on a shaft 13 appropriately supported below the frame member 9. It is driven by a friction wheel 14 that, in turn, is in driving relation with a small electric motor 15. This electric motor 15 is shown as mounted on bracket 17, that in turn is carried on a sponge-rubber pad 16 fastened to frame 9. Reduction gearing mounted in a cover 18 is shown as provided between the motor 15 and the wheel 14.

Figure 1:
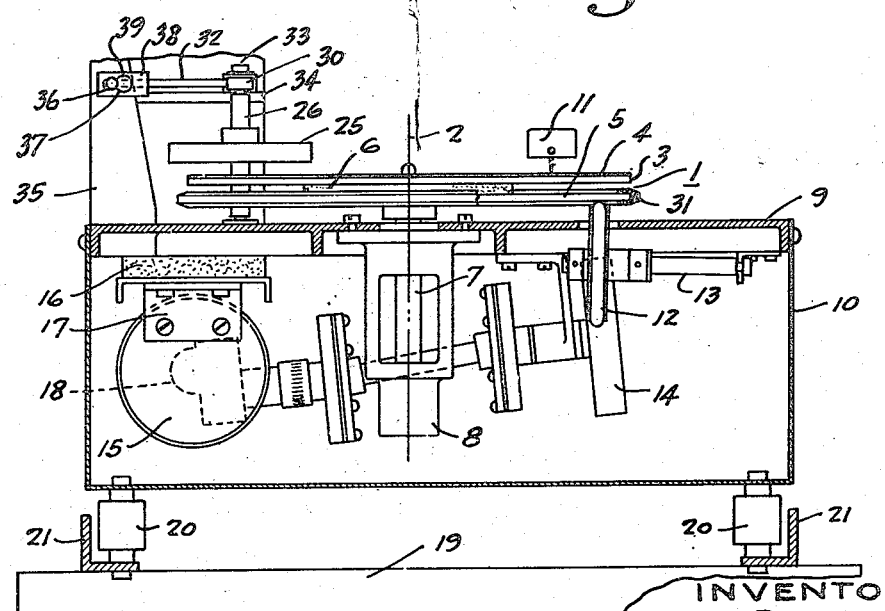
Figure 1 is a view, partly in vertical section, of a recorder incorporating the invention.

The casing 10, as shown most clearly in Figs. 1 and 2, is supported on the spring supports 20 that, in turn, are supported on the angle irons 21. These angle irons 21 extend between the spaced supports 19, and are attached thereto. This mode of supporting the casing is needed where the recorder mechanism is to be installed in a moving vehicle, such as an airplane.

Figure 4:
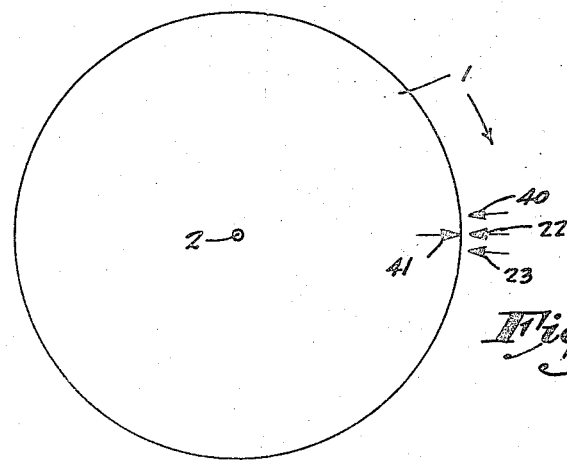
Fig. 4 is a diagram explaining the operation of the invention.

In such installations, unless special precautions are taken, violent and erratic movements of the airplane interfere very greatly with the recording operation. This may be explained in connection with Fig. 4 where the turntable structure 1 is shown as mounted for rotation in a clockwise direction about the axis 2.

The turntable structure is not entirely restrained from relative movement with respect to the airplane, since the turntable can move angularly about axis 2. And since the table has inertia, it cannot immediately follow such erratic movements, and accordingly the angular motion about axis 2 may be violently retarded or accelerated. Thus if the airplane motion has a component having the same direction as the angular motion of table 1, the position of the stylus moves with respect to earth, from arrow 22 to arrow 23, but the inertia of the table tends to keep that point of the table which was under the stylus, at arrow 41. Accordingly, there is retardation or slowing of the turntable velocity.

On the other hand, if the violent movement is such that the entire recorder is moved with respect to earth, in a counter-clockwise direction, the stylus assumes the position of arrow 40 with respect to the earth, while the corresponding turntable point still remains at arrow 41. The result is an acceleration of the turntable velocity.

The mere addition of weight to the table would emphasize these effects. By the aid of this invention, stored kinetic energy of rotation is utilized to change in angular rotation of the turntable structure 1 about the axis 2. Since such angular kinetic energy is measured as the product of the square of angular velocity and the moment of inertia, and since it is desired to reduce inertia effects as much as possible, the stored kinetic energy is obtained by rapid angular motion of a relatively small mass.

For this purpose, a wheel 25 is used. This wheel, although having little weight, has most of that weight concentrated in its rim, in order that the moment of inertia may be as great as possible for the weight utilized. The total weight of the wheel, when using this invention in connection with an ordinary type of phonograph recorder, may be only of the order of five or six ounces.

The wheel 25 is attached to a shaft 26. The lower end of this shaft is cupped to accommodate a ball support 27 mounted in a bearing cup 28. The bearing cup 28 is shown as threadedly supported in the frame 9.

Figure 3:
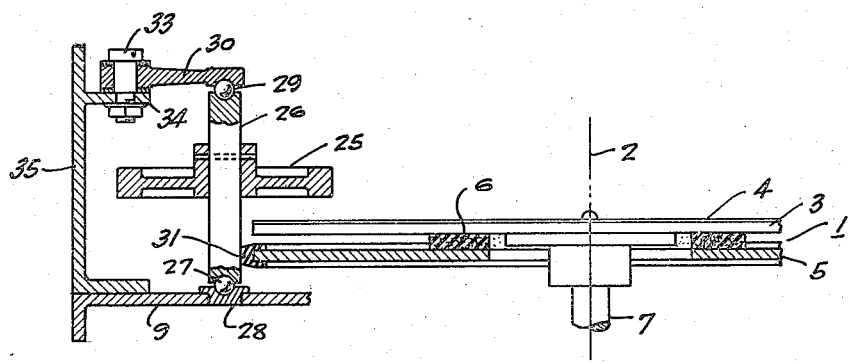
Fig. 3 is an enlarged sectional view taken along plane 3—3 of Fig. 2.

The upper end of the shaft 26 is similarly cupped for engagement with a ball 29. This ball is held in the end of an arm 30, against the upper end of the shaft 26. The balls 27 and 29 permit some slight universal movement of the axis of shaft 26, while it is rotating. In this way the shaft 26 may be urged toward the right, as viewed in Fig. 3, to contact the driving rim 31 mounted on the turntable member 5. This rim 31 may be made of rubber directly contacting the shaft 26.

In order to urge the shaft 26 resiliently into contact with the rim 31, an arm 32 (Figs. 1 and 2) is joined to arm 30, forming a bell crank lever therewith. The lever is mounted for angular movement about a post 33 (Fig. 3) fastened to a bracket 34. This bracket 34 is shown as integral with a corner piece 35 that is supported above the frame 9. At the extremity of the arm 32, a tension spring 36 is provided (Fig. 2). This tension spring is anchored in a key slot 37 formed in a plate 38 that is mounted on the member 35. The tension of the spring is such that the arm is urged in a counter-clockwise direction in order to urge the shaft 26 against the rim 31. The tension of the spring 36 may be readily adjusted by moving the spring laterally so that it is in alignment with the wider portion 39 of the keyhole slot 37; and then, after applying the correct tension of the spring, the spring may be moved back into the narrower portion of the keyhole slot to anchor the spring.

The angular velocity of the wheel 25 is considerably greater than the angular velocity of the table structure, since the diameter of shaft 26 is very much less than that of driving rim 31. This angular velocity of the wheel may be, in fact, of the order of several thousand revolutions a minute, in order to provide the desired storage of kinetic energy.

Erratic movements of the entire recorder have little, if any, effect upon the angular velocity of the turntable structure 1 with respect to its axis 2. This is effected by the stored kinetic energy in the relatively light but rapidly rotated flywheel 25.

The inventor claims:

1. In combination, a turntable, and a stabilizer wheel structure driven by the edge of the turntable, comprising a shaft, a wheel carried by the shaft, a ball upon which the shaft rests, a second ball at the other end of the shaft, a movable arm for supporting said second ball, and means urging said arm in a direction to cause the structure to be urged into driving relation with the turntable.

2. In combination, a turntable, and a stabilizer wheel structure driven by the edge of the turntable, comprising a shaft, a wheel carried by the shaft, a ball upon which the shaft rests, a second ball at the other end of the shaft, a lever having one arm supporting said second ball, as well as another arm, and resilient means connected to said other arm for urging the wheel structure into driving relation with the turntable.

GEORGE P. BRUBAKER.

REFERENCES CITED

The following references are of record in the file of this patent:

UNITED STATES PATENTS

| Number | Name | Date |
| --- | --- | --- |
| 803,556 | Charter | Nov. 7, 1905 |
| 1,381,354 | Shiskoff | June 14, 1921 |
| 2,074,139 | Adler | Mar. 16, 1937 |
| 2,157,158 | Blessing et al. | May 9, 1939 |
| 2,254,844 | Guedon | Sept. 2, 1941 |
| 2,328,703 | Becwar | Sept. 7, 1943 |

FOREIGN PATENTS

| Number | Country | Date |
| --- | --- | --- |
| 575,290 | France | July 26, 1924 |
| 271,810 | Great Britain | May 30, 1928 |
| 309,018 | Italy | June 5, 1931 |
| 698,128 | Germany | Nov. 2, 1940 |